United States Patent
Yuan et al.

(10) Patent No.: US 12,401,560 B2
(45) Date of Patent: Aug. 26, 2025

(54) SYMBOL SENDING METHOD, SYMBOL RECEIVING METHOD, SYMBOL SENDING DEVICE, SYMBOL RECEIVING DEVICE AND STORAGE MEDIUM

(71) Applicant: ZTE CORPORATION, Guangdong (CN)

(72) Inventors: Zhifeng Yuan, Shenzhen (CN); Yu Xin, Shenzhen (CN); Guanghui Yu, Shenzhen (CN); Jin Xu, Shenzhen (CN); Liujun Hu, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 139 days.

(21) Appl. No.: 18/555,454

(22) PCT Filed: Apr. 13, 2022

(86) PCT No.: PCT/CN2022/086496
§ 371 (c)(1),
(2) Date: Oct. 13, 2023

(87) PCT Pub. No.: WO2022/218318
PCT Pub. Date: Oct. 20, 2022

(65) Prior Publication Data
US 2024/0205066 A1     Jun. 20, 2024

(30) Foreign Application Priority Data
Apr. 13, 2021 (CN) .......................... 202110397054.6

(51) Int. Cl.
*H04L 27/36* (2006.01)
*H04L 27/26* (2006.01)
(52) U.S. Cl.
CPC ........ *H04L 27/361* (2013.01); *H04L 27/2602* (2013.01)

(58) Field of Classification Search
CPC ............... H04L 27/361; H04L 27/2602; H04L 27/26035; H04L 27/26025; H04L 27/2603; H04L 27/36; H04L 27/362
See application file for complete search history.

(56) References Cited

U.S. PATENT DOCUMENTS

| 2013/0188595 A1* | 7/2013 | Ikeda | H04L 25/0226 |
| | | | 375/295 |
| 2017/0134193 A1* | 5/2017 | Sugihara | H04L 25/067 |
| 2020/0153486 A1* | 5/2020 | Murakami | H04L 25/4906 |

FOREIGN PATENT DOCUMENTS

| CN | 103763298 A | 4/2014 |
| CN | 110557219 A | 12/2019 |
| WO | WO 2020124492 A1 | 6/2020 |

OTHER PUBLICATIONS

Discussion on remaining issues of MU CSI enhancement, 3GPP TSG RAN WG1#98bis, Chongqing, China, Oct. 14-20, 2019, 4 pages.

(Continued)

*Primary Examiner* — Khanh C Tran
(74) *Attorney, Agent, or Firm* — Dority & Manning, P.A.

(57) ABSTRACT

A symbol transmitting method, including: determining N+1 transmission symbols $s_0, s_1, s_2, \ldots, s_N$, according to a reference symbol and (M1+M2)*N bits, where 0, 1, 2, ..., N are indices of the N+1 transmission symbols, $s_0$ is a reference symbol, an amplitude of a transmission symbol with index n is determined according to M1 bits, a phase of the transmission symbol with index n is determined according to a phase of a transmission symbol with index n−1 and M2 bits, M1 is an integer greater than or equal to 1. M2 is an integer greater than or equal to 1, N is an integer greater than or equal to 1, $1 \leq n \leq N$, and n is an integer; and transmitting the N+1 transmission symbols.

20 Claims, 4 Drawing Sheets

Determine N+1 transmission symbols $S_0, S_1, S_2, \ldots, S_N$, according to a reference symbol and (M1+M2)*N bits, where 0, 1, 2, ..., N are indices of the N+1 transmission symbols, $S_0$ is a reference symbol, an amplitude of a transmission symbol with index n is determined according to M1 bits, a phase of the transmission symbol with index n is determined according to a phase of a transmission symbol with index n-1 and M2 bits, M1 is an integer greater than or equal to 1, M2 is an integer greater than or equal to 1, N is an integer greater than or equal to 1, $1 \leq n \leq N$, and n is an integer — 110 transmit the N+1 transmission symbols — 120

(56) References Cited

OTHER PUBLICATIONS

International Search Report (with English translation) for corresponding Application No. PCT/CN2022/086496, dated Jul. 15, 2022, 12 pages.
Extended European Search Report for corresponding Application No. EP 22 787 540, dated Mar. 17, 2025, 9 pages.
Kwon et al., "A Higher Data-Rate T-DMB System Based on Hierarchical A-DPSK Modulation", IEEE Transactions on Broadcasting, vol. 55, No. 1, Mar. 2009, pp. 42-50.
Rania, "Investigations on Increased Data Rate Differential Space-Time Block Codes for Single Carrier Wireless Systems", arXiv: 1902.03906v1, Feb. 8, 2019, 146 pages.
Sandell et al., "Near-Optimal DAPSK Demodulation Using a PARAFAC Decomposition", IEEE Transactions on Vehicular Technology, vol. 67, No. 3, Mar. 2018, pp. 2077-2083.

\* cited by examiner

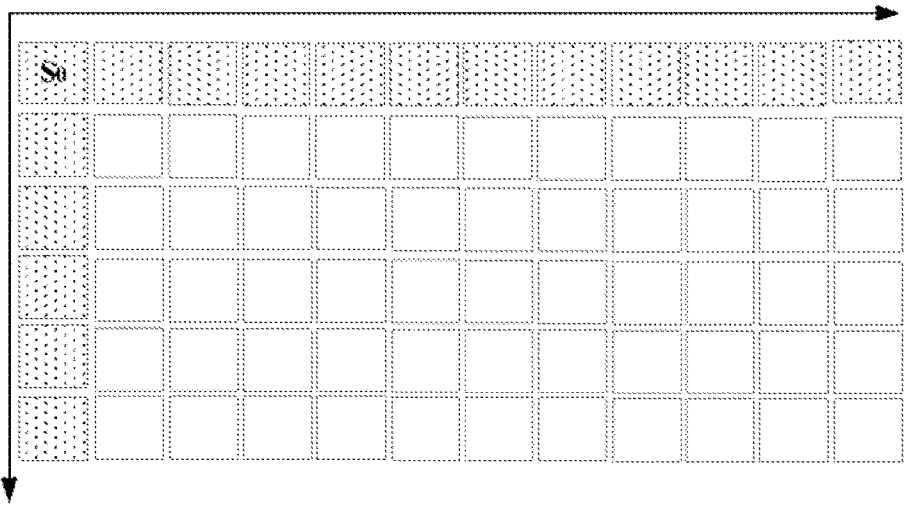

FIG. 4

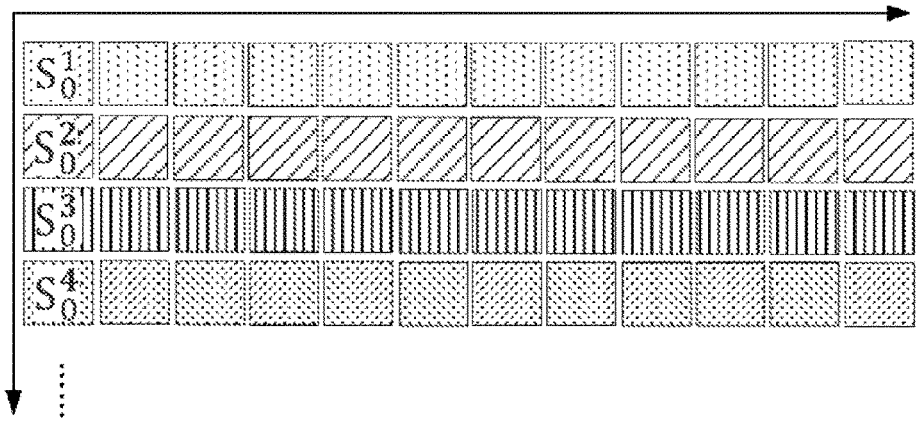

FIG. 5

| Receive N+1 transmission symbols $S_0, S_1, S_2, ..., S_N$, where $0, 1, 2, ..., N$ are indices of the transmission symbols, $S_0$ is a reference symbol, an amplitude of a transmission symbol with index n is determined according to M1 bits, and a phase of the transmission symbol with index n is determined according to a phase of a transmission symbol with index of n-1 and M2 bits, M1 is an integer greater than or equal to 1, M2 is an integer greater than or equal to 1, N is an integer greater than or equal to 1, $1 \leq n \leq N$, and n is an integer | ~210 |

↓

| Demodulate the N+1 transmission symbols, to obtain (M1+M2)*N bits | ~220 |

FIG. 6

SYMBOL SENDING METHOD, SYMBOL RECEIVING METHOD, SYMBOL SENDING DEVICE, SYMBOL RECEIVING DEVICE AND STORAGE MEDIUM

CROSS-REFERENCE TO RELATED APPLICATION(S)

The present disclosure is a national phase entry under 35 USC 371 of International Patent Application No. PCT/CN2022/086496 filed on Apr. 13, 2022, the International Patent Application is filed based on Chinese Patent Application with the application No. 202110397054.6, filed on Apr. 13, 2021, and claims priority to the Chinese Patent Application, the entire contents of the International Patent Application and the Chinese Patent Application are incorporated herein by reference.

TECHNICAL FIELD

The present disclosure relates to the field of data modulation, and for example, to a symbol transmitting method, a symbol receiving method, a transmitting device, a receiving device and a storage medium.

BACKGROUND

In wireless communication technology, differential phase modulation (Differential Phase Shift Key, DPSK) refers to the usage of a phase difference between two symbols before and after to carry to-be-transmitted data, and thus, efficient transmission of data may be implemented in the case of presence of a phase noise, a frequency offset or a time offset, and a receiving end may also adopt a phase difference between modulated symbols to demodulate the transmitted data, so as to recover the transmitted data. However, the dimension is single by using the phase difference to carry the to-be-transmitted data, and thus, the spectrum utilization needs to be improved.

SUMMARY

The present disclosure provides a symbol transmitting method, a symbol receiving method, a transmitting device, a receiving device and a storage medium, so as to improve the spectrum utilization of data transmission.

The embodiments of the present disclosure provide a symbol transmitting method, including:

determining N+1 transmission symbols $s_0, s_1, s_2, \ldots, s_N$, according to a reference symbol and (M1+M2)*N bits, where 0, 1, 2, . . . , N are indices of the N+1 transmission symbols, $s_0$ is a reference symbol, an amplitude of a transmission symbol with index n is determined according to M1 bits, a phase of the transmission symbol with index n is determined according to a phase of a transmission symbol with index n−1 and M2 bits, M1 is an integer greater than or equal to 1, M2 is an integer greater than or equal to 1. N is an integer greater than or equal to 1, 1≤n≤N, and n is an integer; and transmitting the N+1 transmission symbols.

The embodiments of the present disclosure further provide a symbol receiving method, including:

receiving N+1 transmission symbols $s_0, s_1, s_2, \ldots, s_N$, where 0, 1, 2, . . . , N are indices of the N+1 transmission symbols, $s_0$ is a reference symbol, an amplitude of a transmission symbol with index n is determined according to M1 bits, a phase of the transmission symbol with index n is determined according to a phase of a transmission symbol with index n−1 and M2 bits, M1 is an integer greater than or equal to 1, M2 is an integer greater than or equal to 1, N is an integer greater than or equal to 1, 1≤n≤N, and n is an integer; and demodulating the N+1 transmission symbols, to obtain (M1+M2)*N bits.

The embodiments of the present disclosure further provide a symbol transmitting method, including:

determining transmission symbols, where an amplitude of at least one transmission symbol with index n is determined according to M1 bits, a phase of the at least one transmission symbol with index n is determined according to a phase of a transmission symbol with index non-n and M2 bits, M1 is an integer greater than or equal to 1. M2 is an integer greater than or equal to 1, and n is an integer; and transmitting the transmission symbols.

The embodiments of the present disclosure further provide a symbol receiving method, including:

receiving transmission symbols, where an amplitude of at least one transmission symbol with index n is determined according to M1 bits, a phase of the at least one transmission symbol with index n is determined according to a phase of a transmission symbol with index non-n and M2 bits, M1 is an integer greater than or equal to 1, M2 is an integer greater than or equal to 1, and n is an integer; and demodulating the transmission symbols, to obtain bits used to determine the transmission symbols, where the bits used to determine the transmission symbols include M1+M2 bits.

The embodiments of the present disclosure further provide a transmitting device, including: a memory, a processor, and a computer program stored on the memory and runnable on the processor, where the processor, upon executing the program, implements the above-mentioned symbol transmitting methods.

The embodiments of the present disclosure further provide a receiving device, including: a memory, a processor, and a computer program stored on the memory and runnable on the processor, where the processor, upon executing the program, implements the above-mentioned symbol receiving methods.

The embodiments of the present disclosure further provide a computer readable storage medium having stored a computer program thereon, where the program, upon being executed by a processor, implements the above-mentioned symbol transmitting methods and symbol receiving methods.

BRIEF DESCRIPTION OF THE DRAWINGS

FIG. 4 is a schematic diagram of reference symbols for two groups of bits being the same provided by an embodiment;

FIG. 5 is a schematic diagram of reference symbols for each group of bits being different provided by an embodiment;

FIG. 6 is a flow chart of a symbol receiving method provided by an embodiment;

DETAILED DESCRIPTION

Figure 1:
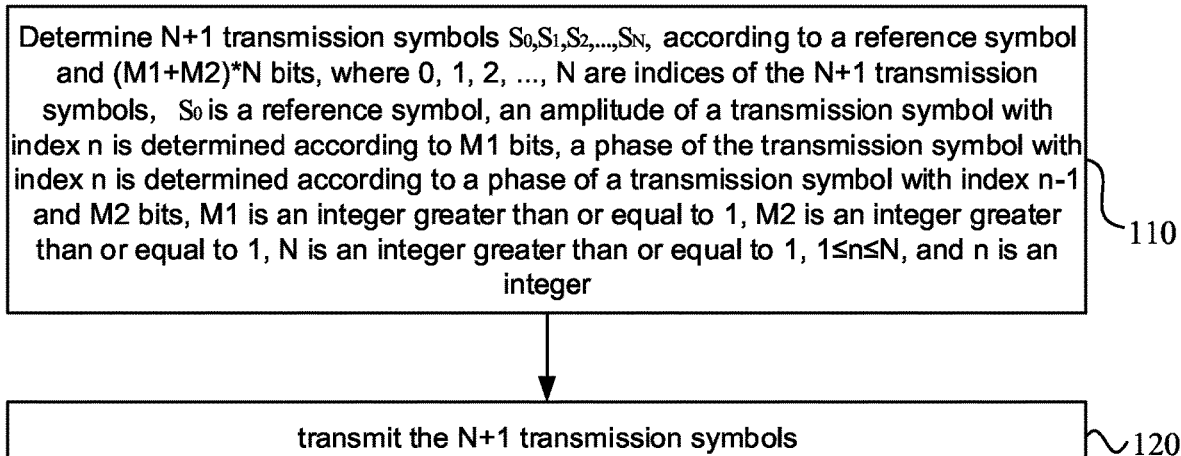
FIG. 1 is a flow chart of a symbol transmitting method provided by an embodiment.

The present disclosure is described below in conjunction with the drawings and the embodiments. The specific embodiments described herein are only for explaining the present disclosure. For ease of description, only those parts related to the present disclosure are shown in the drawings.

In the embodiments of the present disclosure, a symbol transmitting method is provided, the method may be applied to a transmitting device or a transmitting end, and adopt a phase difference and an amplitude difference of two symbols to carry bit information, thereby improving spectral efficiency. FIG. 1 is a flow chart of a symbol transmitting method provided by an embodiment. As shown in FIG. 1, the method provided by this embodiment includes step 110 and step 120.

In step 110, N+1 transmission symbols $s_0, s_1, s_2, \ldots, s_N$ are determined according to a reference symbol and (M1+M2)*N bits, where $0, 1, 2, \ldots, N$ are indices of the N+1 transmission symbols, $s_0$ is a reference symbol, an amplitude of a transmission symbol with index n is determined according to M1 bits, a phase of the transmission symbol with index n is determined according to a phase of a transmission symbol with index n−1 and M2 bits, M1 is an integer greater than or equal to 1, M2 is an integer greater than or equal to 1, N is an integer greater than or equal to 1, $1 \le n \le N$, and n is an integer. In step 120, the N+1 transmission symbols are transmitted.

In this embodiment, the N+1 transmission symbols are denoted as $s_0, s_1, s_2, \ldots, s_N$, where a transmission symbol $s_0$ with index 0 is the reference symbol, $s_0$ is independent of $s_1, s_2, \ldots, s_N$, $s_0$ may be a symbol with a preset amplitude and a preset phase, $s_1, s_2, \ldots, s_N$ are generated by (M1+M2)*N bits. On the basis of the reference symbol, starting from a transmission symbol with index 1, an amplitude of each transmission symbol is determined according to M1 bits, a phase of each transmission symbol is determined according to a phase of a previous transmission symbol and M2 bits, and thus, N transmission symbols may be determined with (M1+M2)*N bits in total. N+1 symbols transmitted finally carry a total of (M1+M2)*N bits of information. Herein, (M1+M2)*N bits are bits to be transmitted, and generally, are (M1+M2)*N bits in bits formed by to-be-transmitted information bits being encoded by channel error correction coding and cyclic redundancy check (CRC) coding.

In an embodiment, step 110 includes:

step 112: generating a corresponding first real number according to the M1 bits, and taking the first real number as the amplitude of the transmission symbol with index n.

In this embodiment, the determination or generation of the transmission symbol with index n requires using M1+M2 bits, and according to M1 bits of the M1+M2 bits, a first real number may be generated as the amplitude of the transmission symbol with index n. Overall, among (M1+M2)*N bits, there are M1*N bits for determining amplitudes of the N transmission symbols, where a first real number is generated for every M1 bits, and a total of N real numbers $a_1, a_2, \ldots, a_N$ are generated, as amplitudes of the N transmission symbols.

In an embodiment, step 110 includes:

step 114: generating a corresponding second real number according to the M2 bits; and step 116: adding the second real number to a phase of a transmission symbol with index n−1, to obtain the phase of the transmission symbol with index n.

In this embodiment, the determination or generation of the transmission symbol with index n requires using M1+M2 bits, and for the phase of the transmission symbol with index n, a second real number is generated as a phase differential component, according to M2 bits in the M1+M2 bits, and the phase of the transmission symbol with index n may be obtained by adding the phase differential component to the phase of the transmission symbol with index n−1. Overall, among the (M1+M2)*N bits, there are M2*N bits for determining the phase differential component of the N transmission symbols, where a second real number is generated for every M2 bits, and a total of N second real numbers $\varphi_1, \varphi_2, \ldots, \varphi_N$ are generated, each second real number is a phase differential component; among the N transmission symbols $s_1, s_2, \ldots, s_N$, the phase $\theta_n$ of the transmission symbol $s_n$ with the index value being n is equal to the phase $\theta_{n-1}$ of the transmission symbol with the index value being n−1 plus $\varphi_n$, where $1 \le n \le N$.

Since $\exp(j*(a+2\pi)) = \exp(j*a)$, i.e., a phase of a complex number is increased by $2\pi$, that is, the phase is turned one more turn, which is equivalent to no change in the phase, and therefore, the phase of the transmission symbols with index n can be obtained by adding the phase differential component to the phase of the transmission symbol with index n−1, and further processing can be performed as follows: if the added result exceeds a range of 0~$2\pi$, then the result may be added with k*$2\pi$, k is an integer which may be a positive integer or a negative integer, so that the added result is within the range of 0~$2\pi$.

In the process of generating N+1 transmission symbols, this embodiment also uses an amplitude of each transmission symbol to carry M1 more bits of to-be-transmitted data on the basis of the phase differential. For example, for 8 bits of to-be-transmitted data, if only the phase differential is used, a real number is generated for every 4 bits, and a total of 2 real numbers are generated, i.e., 2 phase differential components, then $s_1, s_2$ may be generated in sequence based on a preset $s_0$, i.e., 3 transmission symbols are required to carry 8 bits of to-be-transmitted data. However, by adopting the above method of combining the phase differential with using the amplitude to carry data, a real number is generated as a phase differential component according to the first 4 bits, $s_1$ is generated based on the preset so, and a real number is generated as an amplitude of the Si based on the last 4 bits, 2 transmission symbols are sufficient to carry 8 bits of to-be-transmitted data, thereby improving the spectral efficiency.

In an embodiment, the method further includes:

step 100: determining a first mapping relationship between the M1 bits and $2^{M1}$ first real numbers; where the first mapping relationship meets that: two groups of bit sequences each consisting of M1 bits, corresponding to 2 first real numbers with a closest distance to each other among the $2^{M1}$ first real numbers, are different by only 1 bit.

In this embodiment, the process of generating N first real numbers $a_1, a_2, \ldots, a_N$ with M1*N bits is performed as follows:

since there are a total of $2^{M1}$ different value cases for M1 bits, the M1 bits can generate $2^{M1}$ first real numbers, only one of which is used as the amplitude of the transmission symbol $s_n$. At the transmitting end, an corresponding to a value of M1 bits may be determined by a table.

Table 1 is a mapping relationship table of M1 bits and $2^{M1}$ first real numbers. Table 1 contains $2^{M1}$ rows and 2 columns. $2^{M1}$ rows of column 1 contain all value cases of M1 bits (also referred to as an M1 long bit sequence, let as $b_1, b_2, \ldots, b_{M1}$), $2^{M1}$ rows of column 2 contain first real numbers corresponding to the various value cases, let as $A_1, A_2, A_3, A_4, \ldots, A_{2^{M1}}$. Let M1 bits of n-th group be $b_{n,1}{}^a, b_{n,2}{}^a, \ldots, b_{n,M1}{}^a$), $2^{M1}$, then a row of $b_{n,1}{}^a, b_{n,2}{}^a, \ldots, b_{n,M1}{}^a = b_1, b_2, \ldots, b_{M1}$ may be found in the table, so that a first real number in column 2 of that row is used as an. The rows and columns of table 1 may be interchanged, i.e., 2 rows and $2^{M1}$ columns, and in addition, the mapping relationship between the M1 bits and the $2^{M1}$ first real numbers may be recorded in other form other than the table.

TABLE 1 mapping relationship table of M1 bits and $2^{M1}$ first real numbers

| M1 bits $b_1, b_2, \ldots, b_{M1}$ | Corresponding $2^{M1}$ first real numbers |
|---|---|
| 00 . . . 00 | $A_1$ |
| 00 . . . 01 | $A_2$ |
| 00 . . . 11 | $A_3$ |
| 00 . . . 10 | $A_4$ |
| . . . | . . . |
| 11 . . . 11 | $A_{2^{M1}}$ |

In an embodiment, the mapping relationship between the M1 bits and $2^{M1}$ first real numbers meets a Gray mapping. The transmitting end determines an amplitude using every M1 bits of to-be-transmitted data, and a receiving end may recover the corresponding M1 bits according to an amplitude of each transmission symbol. The M1 bits and the $2^{M1}$ first real numbers meeting the Gray mapping, aims to ensure optimal demodulation performance of the receiving end, and reduce a bit error rate (BER) of demodulation of the receiving end.

Figure 2:
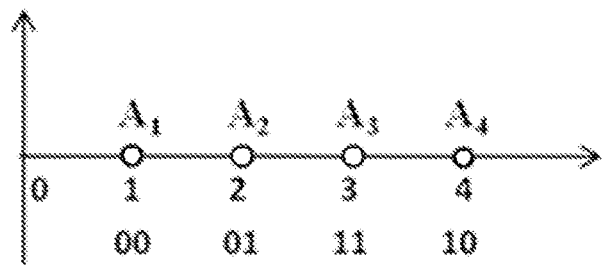
FIG. 2 is a schematic diagram of a first mapping relationship meeting a Gray mapping provided by an embodiment.

FIG. 2 is a schematic diagram of a first mapping relationship meeting a Gray mapping provided by an embodiment. As shown in FIG. 2, take M1=2 as an example, 4 points $A_1, A_2, A_3, A_4$ are first real numbers 1, 2, 3, 4 on a horizontal axis (x axis), respectively, representing 4 amplitude values, each of which corresponds to a value of 2 bits. In FIG. 2, all bit sequences corresponding to two points with a closest distance to each other are different by only 1 bit. In this case, if the transmission process would be affected by noise or other interference, the receiving end may misjudge the received transmission symbol as other points close to the received transmission symbol. On the basis of using the Gray mapping, even if the misjudging is made, it would usually cause only a 1-bit error, thereby reducing the BER.

For value cases of M1 bits of a first column in table 1 (adjacent value cases are different by only 1 bit), if $2^{M1}$ first real numbers $A_1, A_2, \ldots, A_{2^{M1}}$ in a second column are arranged from top to bottom in order of size (may be arranged from the smallest to the largest or from the largest to the smallest), then the Gray mapping is met.

Some examples of the mapping relationship between M1 bits and $2^{M1}$ first real numbers are given below.

Table 2 is a mapping relationship table of M1=1 bit and $2^{M1}$=2 first real numbers. As shown in table 2, if 1 bit of to-be-transmitted data is 0, then an amplitude of the currently generated transmission symbol is $\alpha$; if 1 bit of to-be-transmitted data is 1, an amplitude of the currently generated transmission symbol is $2\alpha$, $\alpha$ is a scaling factor of the transmission symbol, which may also be referred to as a power adjustment factor, and generally, is a power normalization factor of the transmission symbol. For table 2, the power normalization factor $\alpha$ of the transmission symbol meets a relationship:

$$\alpha^2 * \frac{1}{2}(1^2 + 2^2) = 1, \text{ that is, } \alpha = \sqrt{\frac{2}{1^2 + 2^2}} = \sqrt{\frac{2}{5}}.$$

TABLE 2 mapping relationship table of M1 = 1 bit and $2^{M1}$ = 2 first real numbers

| 0 | 1* $\alpha$ |
|---|---|
| 1 | 2* $\alpha$ |

Table 3 is another mapping relationship table of M1=1 bit and $2^{M1}$=2 first real numbers. As shown in table 3, if 1 bit of to-be-transmitted data is 0, then an amplitude of the currently generated transmission symbol is $\alpha$; and if 1 bit of to-be-transmitted data is 1, then an amplitude of the currently generated transmission symbol is $3\alpha$, $\alpha$ is a power normalization factor of the transmission symbol. For table 3, $$\alpha^2 * \frac{1}{2}(1^2 + 3^2) = 1, \text{ that is, } \alpha = \sqrt{\frac{2}{1^2 + 3^2}} = \sqrt{\frac{1}{5}}.$$

TABLE 3 mapping relationship table of M1 = 1 bit and $2^{M1}$ = 2 first real numbers

| 0 | 1* $\alpha$ |
|---|---|
| 1 | 3* $\alpha$ |

Table 4 is another mapping relationship table of M1=1 bit and $2^{M1}$=2 first real numbers. As shown in table 4, if 1 bit of to-be-transmitted data is 0, then an amplitude of the currently generated transmission symbol is 2α; and if 1 bit of to-be-transmitted data is 1, then an amplitude of the currently generated transmission symbol is 3α, α is a power normalization factor of the transmission symbol. For table 4, $$\alpha^2 * \frac{1}{2}(2^2 + 3^2) = 1, \text{ that is, } \alpha = \sqrt{\frac{2}{2^2+3^2}} = \sqrt{\frac{2}{13}}.$$

TABLE 4 mapping relationship table of M1 = 1 bit and $2^{M1}$ = 2 first real numbers

| | |
|---|---|
| 0 | 2* α |
| 1 | 3* α |

Table 5 is a mapping relationship table of M1=2 bits and $2^{M1}$=4 first real numbers. As shown in table 5, if 2 bits of to-be-transmitted data is 00, an amplitude of the currently generated transmission symbol is α; if 2 bits of to-be-transmitted data is 01, an amplitude of the currently generated transmission symbol is 2α; if 2 bits of to-be-transmitted data is 11, an amplitude of the currently generated transmission symbol is 3α; if 2 bits of to-be-transmitted data is 10, an amplitude of the currently generated transmission symbol is 4α. For table 5, a power normalization factor α of the transmission symbol meets:

$$\alpha = \sqrt{\frac{2^2}{1^2 + 2^2 + 3^2 + 4^2}} = \sqrt{\frac{4}{30}}.$$

TABLE 5 mapping relationship table of M1 = 2 bit and $2^{M1}$ = 4 first real numbers

| | |
|---|---|
| 00 | 1* α |
| 01 | 2* α |
| 11 | 3* α |
| 10 | 4* α |

Table 6 is another mapping relationship table of M1=2 bits and $2^{M1}$=4 first real numbers. As shown in table 6, if 2 bits of to-be-transmitted data is 00, then an amplitude of the currently generated transmission symbol is α; if 2 bits of to-be-transmitted data is 01, then an amplitude of the currently generated transmission symbol is 3α; if 2 bits of to-be-transmitted data is 11, then an amplitude of the currently generated transmission symbol is 5α; if 2 bits of to-be-transmitted data is 10, then an amplitude of the currently generated transmission symbol is 7α. For table 6, a power normalization factor α of the transmission symbol meets:

$$\alpha = \sqrt{\frac{2^2}{1^2 + 3^2 + 5^2 + 7^2}} = \sqrt{\frac{1}{21}}.$$

TABLE 6 mapping relationship table of M1 = 2 bits and $2^{M1}$ = 4 first real numbers

| M1 bits $b_1, b_2, \ldots, b_M$ | Corresponding $2^{M1}$ first real numbers |
|---|---|
| 00 | 1* α |
| 01 | 3* α |
| 11 | 5* α |
| 10 | 7* α |

Table 7 is another mapping relationship table of M1=2 bits and $2^{M1}$=4 first real numbers. As shown in table 7, if 2 bits of to-be-transmitted data is 00, then an amplitude of the currently generated transmission symbol is 2α; if 2 bits of to-be-transmitted data is 01, then an amplitude of the currently generated transmission symbol is 3α; if 2 bits of to-be-transmitted data is 11, then an amplitude of the currently generated transmission symbol is 4α; if 2 bits of to-be-transmitted data is 10, then an amplitude of the currently generated transmission symbol is 5α. For table 7, a power normalization factor α of the transmission symbol meets:

$$\alpha = \sqrt{\frac{2^2}{2^2 + 3^2 + 4^2 + 5^2}} = \sqrt{\frac{4}{54}}.$$

TABLE 7 mapping relationship table of M1 = 2 bits and $2^{M1}$ = 4 first real numbers

| M1 bits $b_1, b_2, \ldots, b_M$ | Corresponding $2^{M1}$ first real numbers |
|---|---|
| 00 | 2* α |
| 01 | 3* α |
| 11 | 4* α |
| 10 | 5* α |

In an embodiment, the method further includes:

step 102: determining a second mapping relationship between the M2 bits and $2^{M2}$ second real numbers; where the second mapping relationship meets that: two groups of bit sequences each consisting of M2 bits, corresponding to 2 second real numbers with a closest distance to each other among the $2^{M2}$ second real numbers, are different by only 1 bit.

In an embodiment, each first real number is a product of a sub-real number and a corresponding power adjustment factor; and the power adjustment factor is determined according to the $2^{M1}$ sub-real numbers.

In this embodiment, the process of generating N second real numbers $\varphi_1, \varphi_2, \ldots, \varphi_N$ with M2*N bits is performed as follows:

for the n-th group of M2 bits, a second real number on is generated, and a total of N second real numbers $\varphi_1, \varphi_2, \ldots, \varphi_N$ are generated. Since there are a total of $2^{M2}$ different value cases for the M2 bits, $2^{M2}$ second real numbers may be generated for the M2 bits, only one of which is used as a phase differential component $\varphi_n$ between the transmission symbol $s_n$ and the previous transmission symbol $s_{n-1}$. The transmitting end may implement the purpose of generating a second real number for every group of M2 bits by a table.

Table 8 is a mapping relationship table of M2 bits and $2^{M2}$ second real numbers. Table 8 contains $2^{M2}$ rows and 2 columns. Generally, $2^{M2}$ rows of column 1 contains all cases of M2 bits (which may also be referred to as an M2 long bit sequence, let as $b_1, b_2, \ldots, b_{M2}$), and $2^{M2}$ rows of column 2 contain corresponding second real numbers.

Let a n-th group of M2 bits be $b_{n,1}{}^\Phi, b_{n,2}{}^\Phi, \ldots, n_{n,M2}{}^\Phi$, then a row of $b_{n,1}{}^\Phi, b_{n,2}{}^\Phi, \ldots, b_{n,M2}{}^\Phi = b_1, b_2, \ldots, b_{M2}$ may be found by this table, and a second real number on another unit cell of this row may be obtained, this second real number may be used as $\Phi_n$. The rows and columns of table 8 may be interchanged, i.e., 2 rows and $2^{M2}$ columns, and in addition, the mapping relationship of M2 bits and $2^{M2}$ second real numbers may be recorded in other forms other than the table.

TABLE 8 mapping relationship table of M2 bits and $2^{M2}$ second real numbers

| M2 bits $b_1, b_2, \ldots, b_{M2}$ | Corresponding $2^{M2}$ second real numbers |
|---|---|
| 00 . . . 00 | $\Phi_1$ |
| 00 . . . 01 | $\Phi_2$ |
| 00 . . . 11 | $\Phi_3$ |
| 00 . . . 10 | $\Phi_4$ |
| . . . | . . . |
| 11 . . . 11 | $\Phi_{2^{M2}}$ |

In an embodiment, the mapping relationship between the M2 bits and $2^{M2}$ second real numbers meets a Gray mapping. The transmitting end determines a phase difference using every M2 bits of to-be-transmitted data, and the receiving end may recover the corresponding M2 bits by a phase difference of two adjacent transmission symbols. The M2 bits and the $2^{M2}$ second real numbers meeting the Gray mapping, aims to ensure optimal demodulation performance of the receiving end, and reduce a bit error rate (BER) of demodulation of the receiving end.

Figure 3:
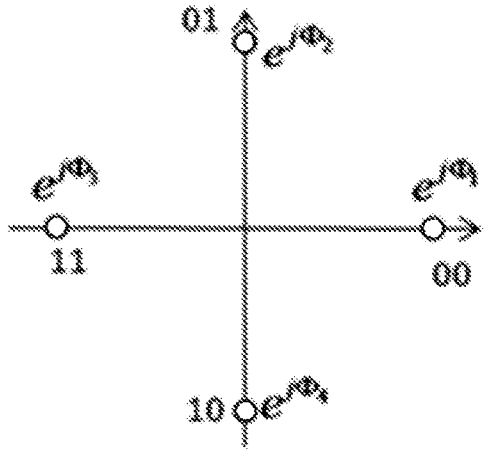
FIG. 3 is a schematic diagram of a second mapping relationship meeting a Gray mapping provided by an embodiment.

FIG. 3 is a schematic diagram of a second mapping relationship meeting a Gray mapping provided by an embodiment. As shown in FIG. 3, take M2=2 as an example, $2^{M2}=4$ points $\Phi_1, \Phi_2, \Phi_3, \Phi_4$ are second real numbers 0, $\pi/2$, $\pi$, $3\pi/2$ on a horizontal axis (x axis), respectively, representing 4 phase differential components, each of which corresponds to a value of 2 bits. In FIG. 3, all bit sequences corresponding to two points with a closest distance to each other are different by only 1 bit. In this case, if the transmission process would be affected by noise or other interference, the receiving end may misjudge the received transmission symbol as other points close to the received transmission symbol. On the basis of using the Gray mapping, even if the misjudging is made, it would usually cause only a 1-bit error, thereby reducing the BER.

For value cases of M2 bits of a first column in table 8 (adjacent value cases are different by only 1 bit), if $2^{M2}$ second real numbers $\Phi_1, \Phi_2, \ldots, \Phi_{2^{M2}}$ in a second column are arranged from top to bottom in order of size (may be arranged from the smallest to the largest or from the largest to the smallest), then the Gray mapping is met.

Some examples of the mapping relationship between M2 bits and $2^{M2}$ second real numbers are given below.

Table 9 is a mapping relationship table of M2=1 bit and $2^{M2}=2$ second real numbers. As shown in Table 9, if 1 bit of to-be-transmitted data is 0, then a phase of the currently generated transmission symbol is the same as a phase of a previous transmission symbol; and if 1 bit of to-be-transmitted data is 1, then a phase of the currently generated transmission symbol is obtained based on a phase of a previous transmission symbol plus $\pi$, $\pi$ denotes pi, i.e., $\pi$ may also denote a 180° angle.

TABLE 9 mapping relationship table of M2 = 1 bit to $2^{M2}$ = 2 second real numbers

| 0 | 0 |
|---|---|
| 1 | $\pi$ |

Table 10 is another mapping relationship table of M2=1 bit and $2^{M2}=2$ second real numbers. As shown in Table 10, if 1 bit of to-be-transmitted data is 0, then a phase of the currently generated transmission symbol is obtained based on a phase of a previous transmission symbol minus $\pi/2$; if 1 bit of to-be-transmitted data is 1, then a phase of the currently generated transmission symbol is obtained based on a phase of the previous transmission symbol plus $\pi/2$, where $\pi$ denotes pi.

TABLE 10 mapping relationship table of M2 = 1 bit to $2^{M2}$ = 2 second real numbers

| 0 | $-\pi/2$ |
|---|---|
| 1 | $\pi/2$ |

Table 11 is a mapping relationship table of M2=2 bits and $2^{M2}=4$ second real numbers. As shown in table 11, if 2 bits of to-be-transmitted data is 00, then a phase of the currently generated transmission symbol is the same as a phase of a previous transmission symbol; if 2 bits of to-be-transmitted data is 01, then a phase of the currently generated transmission symbol is obtained based on a phase of a previous transmission symbol plus $\pi/2$; if 2 bits of to-be-transmitted data is 11, then a phase of the currently generated transmission symbol is obtained based on a phase of a previous transmission symbol plus $\pi$; if 2 bits of to-be-transmitted data is 10, then a phase of the currently generated transmission symbol is obtained based on a phase of a previous transmission symbol plus $3*\pi/2$, where $\pi$ denotes pi.

TABLE 11 mapping relationship table of M2 = 2 bits and $2^{M2}$ = 4 second real numbers

| 00 | 0 |
|---|---|
| 01 | $\pi/2$ |
| 11 | $\pi$ |
| 10 | $3*\pi/2$ |

Table 12 is a mapping relationship table of M2=3 bits and $2^{M2}=8$ second real numbers. As shown in table 12, if 3 bits of to-be-transmitted data is 000, then a phase of the currently generated transmission symbol is the same as a phase of a previous transmission symbol; if 3 bits of to-be-transmitted data is 001, then a phase of the currently generated transmission symbol is obtained based on a phase of a previous transmission symbol plus $\pi/4$; if 3 bits of to-be-transmitted data is 011, then a phase of the currently generated transmission symbol is obtained based on a phase of a previous transmission symbol plus $2*\pi/4$, . . . , and so on, where $\pi$ denotes pi.

TABLE 12 mapping relationship table of M2 = 3 bits
and $2^{M2}$ = 8 second real numbers

| | |
|---|---|
| 000 | 0 |
| 001 | π/4 |
| 011 | 2*π/4 |
| 010 | 3*π/4 |
| 110 | π |
| 100 | 5*π/4 |
| 101 | 6*π/4 |
| 111 | 7*π/4 |

Table 13 and table 14 are two mapping relationship tables of M2 bits and $2^{M2}$ second real numbers, respectively. Let $\Phi=2\pi/2^{M2}$, the transmitting end implements the mapping of M2 bits and $2^{M2}$ second real numbers by table 13 or table 14, i.e., the transmitting end implements the purpose of generating a second real number for every group of M2 bits by table 13 or table 14. π in the tables is pi.

TABLE 13 mapping relationship table of M2 bits and $2^{M2}$ second real numbers

| M2 bits $b_{n,1}, b_{n,2}, \ldots, b_{n,M2}$ | Corresponding $2^{M2}$ second real numbers |
|---|---|
| 00 . . . 00 | 0 |
| 00 . . . 01 | $1_\Phi$ |
| 00 . . . 11 | $2_\Phi$ |
| 00 . . . 10 | $3_\Phi$ |
| . | . |
| . | . |
| . | . |
| 11 . . . 11 | $(2^{M2} - 1) *\Phi$ |

TABLE 14 mapping relationship table of M2 bits and $2^{M2}$ second real numbers

| M2 bits $b_{n,1}, b_{n,2}, \ldots, b_{n,M2}$ | Corresponding $2^{M2}$ second real numbers |
|---|---|
| 00 . . . 00 | $0.5_\Phi$ |
| 00 . . . 01 | $1.5_\Phi$ |
| 00 . . . 11 | $2.5_\Phi$ |
| 00 . . . 10 | $3.5_\Phi$ |
| . | . |
| . | . |
| . | . |
| 11 . . . 11 | $(2^{M2} - 1) *\Phi$ |

In an embodiment, M2 bits used to determine a phase of a transmission symbol with an index of an odd number and a corresponding second real number meet a first type of the second mapping relationship; and M2 bits used to determine a phase of a transmission symbol with index of an even number and a corresponding second real number meet a second type of the second mapping relationship.

In this embodiment, M2*N bits used to determine phases of the transmission symbols and the corresponding real numbers may meet at least two types of the second mapping relationship.

In a case, a phase differential component of a transmission symbol $s_{2z+1}$ (z is an integer greater than or equal to 0, and $s_{2z+1}$ refers to the generated odd-numbered transmission symbol, e.g., s1, s3, s5, etc.) is determined in accordance with a first type of the second mapping relationship between M2 bits and $2^{M2}$ second real number (e.g., the second mapping relationship shown in table 13), and then a phase of $s_{2z+1}$ is obtained by adding this phase differential component and a phase of a previous transmission symbol; and a phase differential component of the transmission symbol $s_{2z+2}$ (z is an integer greater than or equal to 0, and $s_{2z+2}$ refers to the generated even-numbered transmission symbol, e.g., s2, s4, s6, etc.) is determined in accordance with a second type of the second mapping relationship between M2 bits and $2^{M2}$ second real number (e.g., the second mapping relationship shown in table 14), and then a phase of $s_{2z+2}$ is obtained by adding this phase differential component and a phase of a previous transmission symbol.

In a case, a phase differential component of a transmission symbol $s_{2z+2}$ (z is an integer greater than or equal to 0, and $s_{2z+2}$ refers to the generated even-numbered transmission symbol, e.g., s2, s4, s6, etc.) is determined in accordance with a first type of the second mapping relationship between M2 bits and $2^{M2}$ second real number (e.g., the second mapping relationship shown in table 13), and then a phase of $s_{2z+2}$ is obtained by adding this phase differential component and a phase of a previous transmission symbol; a phase differential component of a transmission symbol $s_{2z+1}$ (z is an integer greater than or equal to 0, and $s_{2z+1}$ refers to the generated odd-numbered transmission symbol, e.g., s1, s3, s5, etc.) is determined in accordance with a second type of the second mapping relationship between M2 bits and $2^{M2}$ second real number (e.g., the second mapping relationship shown in table 14), and then a phase of $s_{2z+1}$ is obtained by adding this phase differential component and a phase of a previous transmission symbol.

The above-mentioned two cases, which are equivalent to the even-number transmission symbol being rotated by 90° with respect to the odd-number transmission symbol, are able to reduce a peak-to-average ratio and improve the performance of the transmission.

In an embodiment, bits used to determine the transmission symbols are divided into multiple groups, where each group includes (M1+M2)*N bits, and the each group corresponds to a reference symbol; and each reference symbol is the same or different.

In this embodiment, the transmitting end may apply the above-mentioned transmitting method for multiple times. For example, an i-th application of the above-mentioned method generates Ni+1 transmission symbols, and then the generated transmission symbols each time are combined and transmitted together. The process of generating the transmission symbols each time may use the same reference symbol or different reference symbols, i.e., the reference symbol involved in the process of generating the Ni+1 transmission symbols for the i-th time is denoted as $s'_0$, then $s'_0$ may be the same or different. If reference symbols involved in the processes of generating Ni+1 transmission symbols for multiple times are the same, then only one reference symbol may be transmitted.

FIG. 4 is a schematic diagram of reference symbols for two groups of bits being the same provided by an embodiment. The transmission symbols are transmitted by a two-dimensional time-frequency resource, for example, the symbols are transmitted by means of orthogonal frequency division multiplexing (OFDM), and as shown in FIG. 4, each square represents a resource element (RE). N1+1 transmission symbols generated by the above method for the first time are transmitted in REs represented by the row where shaded squares are located; N2+1 transmission symbols generated by the above method for the second time are transmitted in REs represented by the column where shaded squares are located, where the reference symbol $s_0$ of the two transmissions is the same, and $s_0$ is transmitted in the RE where the row and the column intersect.

FIG. 5 is a schematic diagram of reference symbols for each group of bits being different provided by an embodiment. As shown in FIG. 5, the same number of transmission symbols are generated by the above method for multiple times, and the transmission symbols generated by the above method each time are transmitted by a row of REs, where the reference signals are different for each transmission, e.g., the reference symbols for the first 3 transmissions are $s_0^1$, $s_0^2$, $s_0^3$.

In an embodiment, the reference symbol is a symbol with a preset amplitude and a preset phase; or, a phase of the reference symbol is preset, an amplitude of the reference symbol is determined according to M3 bits, and M3 and M1 are equal or unequal.

In this embodiment, the amplitude and the phase of the reference symbol $s_0$ may be preset and $s_0$ does not carry to-be-transmitted bit information. Or, in some embodiments, in order to improve the spectral efficiency, the amplitude $a_0$ of $s_0$ may also carry information of the to-be-transmitted data, i.e., the amplitude $a_0$ of $s_0$ may also be a real number generated according to M3 bits. Similarly, the Gray mapping is met between the M3 bits and $2^{M3}$ real numbers.

Compared to amplitude $a_n$ ($1 \leq n \leq N$) of other transmission symbols, the amplitude of $s_0$ may carry information of a same number of bits (i.e., M3=M1) or information of a different number of bits (i.e., M3≠M1).

For example, the amplitude of $s_0$ carries the same number of bits as $a_n$ ($1 \leq n \leq N$) where M3=M1, then among (M1+M2)*N+M1 bits, a total of N+1 real numbers a0, a1, a2, ..., aN are generated by M1*(N+1) bits; where a real number is generated for every M1 bit; another N real numbers $\varphi_1, \varphi_2, \ldots, \varphi_N$ are generated by M2*N bits, where a real number is generated for every M2 bits. On this basis, among the generated N+1 transmission symbols $s_0, s_1, s_2, \ldots, s_N$, the amplitude of each transmission symbol is $a_n$ determined according to the real number generated by M1 bits, the phase $\theta_0$ of $s_0$ is preset, and the phase $\theta_n$ of $s_n$ is equal to a sum of $\varphi_n$ and $\theta_{n-1}$.

For another example, the amplitude of $s_0$ and $a_n$ ($1 \leq n \leq N$) carry the different number of bits, M3≠M1, then among the (M1+M2)*N+M3 bits of to-be-transmitted data, a total of 1 real number a0 is generated by M3 bits, a total of N real numbers a1, a2, ..., aN are generated by M1*N bits, where a real number is generated for every M1 bits; other N real numbers $\varphi_1, \varphi_2, \ldots, \varphi_N$ are generated by M2*N bits, where a real number is generated for every M2 bits. On this basis, among the generated N+1 transmission symbols $s_0, s_1, s_2, \ldots, s_N$, the amplitude of the transmission symbol $s_0$ is $a_0$ determined according to the real number generated by M3 bits, the amplitude of $s_n$ is $a_n$ determined according to the real number generated by M1 bits, the phase $\theta_0$ of $s_0$ is preset, and the phase $\theta_n$ of $s_n$ is equal to a sum of $\varphi_n$ and $\theta_{n-1}$.

The embodiments of the present disclosure further provide a symbol receiving method. The method may be applied to a receiving device or a receiving end. Technical details not exhaustively described in this embodiment may be found in any of the above-mentioned embodiments.

FIG. 6 is a flow chart of a symbol receiving method provided by an embodiment, and as shown in FIG. 6, the method provided by this embodiment includes step 210 and step 220.

In step 210. N+1 transmission symbols $s_0, s_1, s_2, \ldots, s_N$ are received, where 0, 1, 2, ..., N are indices of the N+1 transmission symbols, $s_0$ is a reference symbol, an amplitude of a transmission symbol with index n is determined according to M1 bits, a phase of the transmission symbol with index n is determined according to a phase of a transmission symbol with index n−1 and M2 bits, M1 is an integer greater than or equal to 1. M2 is an integer greater than or equal to 1, N is an integer greater than or equal to 1, $1 \leq n \leq N$, and n is an integer.

In step 220, the N+1 transmission symbols are demodulated to obtain (M1+M2)*N bits.

In this embodiment, according to a phase differential component of the transmission symbol with index n with respect to the transmission symbol with index n−1, and the amplitude of the transmission symbol with index n, (M+1)*N bits may be demodulated, and thus, more bits can be obtained by using fewer transmission symbols for demodulating, thereby improving the spectral efficiency.

In an embodiment, step 220 includes:
step 222: determining the M1 bits according to the amplitude of the transmission symbol with index n; and
step 224: determining M2 bits according to the phase of the transmission symbol with index n and the phase of the transmission symbol with index n−1.

In an embodiment, step 222 includes:
taking the amplitude of the transmission symbol with index n as a first real number, and determining the M1 bits corresponding to the first real number.

In this embodiment, the amplitude of the transmission symbol with index n corresponds to a first real number, and the value of the M1 bits corresponding to the first real number may be determined according to a first mapping relationship between the M1 bits and $2^{M1}$ first real numbers.

In an embodiment, the method further includes:
step 2202: determining a first mapping relationship between the M1 bits and $2^{M1}$ first real numbers; where the first mapping relationship meets that: two groups of bit sequences each consisting of M1 bits, corresponding to 2 first real numbers with a closest distance to each other among the $2^{M1}$ first real numbers, are different by only 1 bit.

In an embodiment, step 224 includes:
determining a corresponding second real number according to a difference between the phase of the transmission symbol with index n and the phase of the transmission symbol with index n−1; and determining the M2 bits corresponding to the second real number.

In this embodiment, the difference value between the phase of the transmission symbol with index n and the phase of the transmission symbol with index n−1 corresponds to a second real number, the second real number is a phase differential component, and the value of the M2 bits corresponding to the second real number may be determined according to a second mapping relationship between the M2 bits and $2^{M2}$ second real numbers.

In an embodiment, the method further includes:
step 2204: determining a second mapping relationship between the M2 bits and $2^{M2}$ second real numbers; where the second mapping relationship meets that: two groups of bit sequences each consisting of M2 bits, corresponding to 2 second real numbers with a closest distance to each other among the $2^{M2}$ second real numbers, are different by only 1 bit.

The following is the demodulation process of the transmission symbols at the receiving end.

In this embodiment, the transmission symbols received at the receiving end include a reference symbol $s_0$ and a transmission symbol $s_n = a_n * \exp(j*(\varphi_n + \theta_{n-1}))$, $1 \leq n \leq N$. After the receiving end receives the transmission symbols, the receiving end first balances a time domain multipath convolution channel (or frequency domain selective fading channel) that the transmission symbols goes through, and the balanced N+1 transmission symbols may be expressed as: $\hat{s}_n = h_n * s_n * \exp(j*\chi_n) + w_n = h_n * a_n * \exp(j*(\varphi_n + \theta_{n-1} + \chi_n)) + w_n$, $0 \leq n \leq N$. Herein, $h_n$ represents a channel weighting that the transmission symbol $s_n$ goes through, $\exp(j*\chi_n)$ represents a rotation of the transmission symbol $s_n$ due to a phase noise, a frequency offset or a time offset, etc., $\Phi_n$ is a phase size of the rotation, and $w_n$ is an additive noise to which $s_n$ is subjected.

The receiving end recovers the (M+1)*N bits of transmission data carried by the transmission symbols based on the received N+1 transmission symbols, by the following two calculations.

1) The amplitude value $|\hat{s}_n|$ of $\hat{s}_n = s_n * \exp(j*\chi_n) + w_n$ is calculated to obtain an estimated value of $a_n$, i.e., $a_n \approx |\hat{s}_n|$, and then M1 bits corresponding to $a_n$ may be solved by $|\hat{s}_n|$.

$$\frac{\hat{s}_n}{\hat{s}_{n-1}} = \frac{a_n \exp(j*(\varphi_n + \theta_{n-1} + \chi_n)) + w_n}{a_{n-1} \exp(j*(\theta_{n-1} + \chi_{n-1})) + w_{n-1}} \approx \frac{a_n}{a_{n-1}} \exp(j*\varphi_n) \quad 2)$$

is calculated, then by taking the phase of $$\frac{\hat{s}_n}{\hat{s}_{n-1}},$$

the estimated value of $\varphi_n$ may be obtained, and further, M2 bits corresponding to $\varphi_n$ may be solved by the estimated value of $\varphi_n$.

The embodiments of the present disclosure further provide a symbol transmitting method. The method is applied to a transmitting device or a transmitting end. Technical details not exhaustively described in this embodiment may be found in any of the above-mentioned embodiments.

Figure 7:
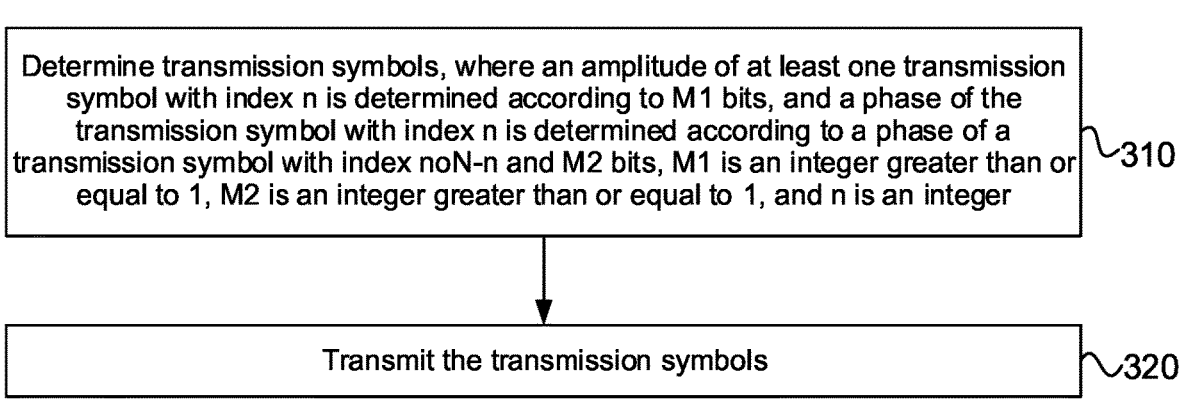
FIG. 7 is a flow chart of another symbol transmitting method provided by an embodiment.

FIG. 7 is a flow chart of a symbol transmitting method provided by an embodiment, and as shown in FIG. 7, the method provided by this embodiment includes step 310 and step 320.

In step 310, the transmission symbols are determined, where an amplitude of at least one transmission symbol with index n is determined according to M1 bits, and a phase of the at least one transmission symbol with index n is determined according to a phase of a transmission symbol with index non-n and M2 bits, M1 is an integer greater than or equal to 1, M2 is an integer greater than or equal to 1, and n is an integer. In step 320, the transmission symbols are transmitted.

In this embodiment, at the transmitting end, there is at least one transmission symbol whose amplitude and phase are determined as follows:
the amplitude of the at least one transmission symbol is determined according to M1 bits; the phase of the at least one transmission symbol is determined according to M2 bits and a phase of another transmission symbol together, herein the another transmission symbol may refer to its previous transmission symbol or to a preset reference symbol; where $M1 \geq 1$ and $M2 \geq 1$.

Assuming a transmission symbol $s_n = a_n * \exp(j*\theta_n)$, then the transmitting end generates an amplitude $a_n$ of $s_n$ by M1 bits; a phase $\theta_n$ of $s_n$ is generated jointly by another M2 bits and a phase of another transmission symbol. On this basis, this transmission symbol carries M1+M2 bits of information, thereby improving the spectral efficiency.

In an embodiment, the transmission symbol with index non-n is a reference symbol, or a transmission symbol with index n−1.

In an embodiment, the amplitude of the at least one transmission symbol with index n is a first real number generated according to the M1 bits.

In this embodiment, there is at least one transmission symbol whose phase is determined according to a second real number generated by M2 bits and a phase of another transmission symbol together.

Step 310 includes:
step 312: generating a first real number according to M1 bits as an amplitude of a transmission symbol.

In an embodiment, the method further includes:
step 3102: determining a first mapping relationship between the M1 bits and $2^{M1}$ first real numbers; where the first mapping relationship meets that: two groups of bit sequences each consisting of M1 bits, corresponding to 2 first real numbers with a closest distance to each other among the $2^{M1}$ first real numbers, are different by only 1 bit.

In this embodiment, different value cases of the M1 bits correspond to different real numbers, and there are a total of $2^{M1}$ value cases and corresponding real numbers for the M1 bits, and a Gray mapping is met between the M1 bits and $2^{M1}$ real numbers.

In an embodiment, the phase of the at least one transmission symbol with index n is obtained by adding the phase of the transmission symbol with index non-n to a second real number, where the second real number is generated according to the M2 bits.

In this embodiment, there is at least one transmission symbol whose phase is determined according to M2 bits and a phase of another transmission symbol together, where for the M2 bits, a corresponding second real number is generated, and the phase of the transmission symbol is equal to a sum of the phase of the another transmission symbol and the second real number.

Step 310 includes:
step 314: generating a first real number as a phase differential component according to M2 bits, and adding the first real number and the phase of the transmission symbol with index non-n, to obtain the phase of the transmission symbol with index n.

In an embodiment, the method further includes:
step 3104: determining a second mapping relationship between the M2 bits and $2^{M2}$ second real numbers; where the second mapping relationship meets that: two groups of bit sequences each consisting of M2 bits, corresponding to 2 second real numbers with a closest distance to each other among the $2^{M2}$ second real numbers, are different by only 1 bit.

In this embodiment, different value cases of the M2 bits correspond to different real numbers, there are $2^{M2}$ value cases and corresponding real numbers for the M2 bits, and a Gray mapping is met between the M2 bits and $2^{M2}$ real numbers.

In an embodiment, step 310 includes:
determining N+1 transmission symbols $s_0, s_1, s_2, \ldots, s_N$, according to a reference symbol and (M1+M2)*N bits, where $0, 1, 2, \ldots, N$ are indices of the N+1 transmission symbols, $s_0$ is a preset reference symbol, an amplitude of a transmission symbol with index n is determined according to M1 bits, a phase of the transmission symbol with index n is determined according to a phase of a transmission symbol with index n−1 and M2 bits, $1 \leq n \leq N$, and N is an integer.

In an embodiment, the reference symbol is a symbol with a preset amplitude and a preset phase; or, a phase of the reference symbol is preset, an amplitude of the reference symbol is determined according to M3 bits, and M3 and M1 are equal or unequal.

According to the method of this embodiment, in the process of generating the transmission symbols, there is at least one transmission symbol, and on the basis of the phase differential based on M2 bits, an amplitude of the at least one transmission symbol may further carry M1 more bits of to-be-transmitted data, thereby improving the spectral efficiency.

The embodiments of the present disclosure further provide a symbol receiving method. The method is applied to a receiving device or a function end. Technical details not exhaustively described in this embodiment may be found in any of the above-mentioned embodiments.

Figure 8:
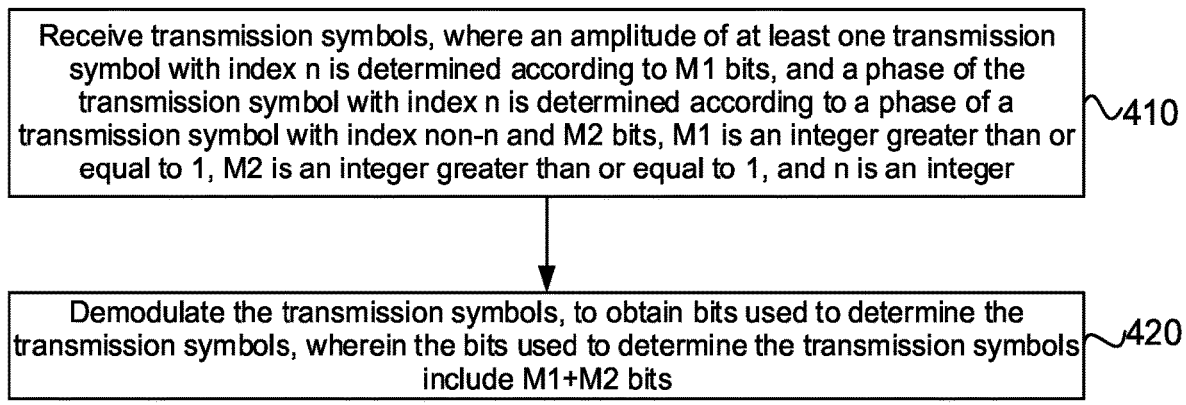
FIG. 8 is a flow chart of another symbol receiving method provided by an embodiment.

FIG. 8 is a flow chart of another symbol receiving method provided by an embodiment, and as shown in FIG. 8, the method provided by this embodiment includes step 410 and step 420.

In step 410, the transmission symbols are received, where an amplitude of at least one transmission symbol with index n is determined according to M1 bits, and a phase of the at least one transmission symbol with index n is determined according to a phase of a transmission symbol with index non-n and M2 bits, M1 is an integer greater than or equal to 1, M2 is an integer greater than or equal to 1, and n is an integer.

In step 420, the transmission symbols are demodulated, to obtain bits used to determine the transmission symbols, where the bits used to determine the transmission symbols include M1+M2 bits.

In this embodiment, according to the amplitude of the transmission symbol with index n, and a phase differential component of the phase of the transmission symbol with index n with respect to the transmission symbol with index n−1, demodulation can be performed to obtain M1+M2 bits, thereby improving the spectral efficiency.

In an embodiment, the transmission symbol with index non-n is a reference symbol, or a transmission symbol with index n−1.

In an embodiment, the amplitude of the at least one transmission symbol with index n is a first real number generated according to the M1 bits.

In this embodiment, there is at least one transmission symbol whose amplitude is a first real number generated according to the M1 bits.

Step 420 includes:
step 422: determining corresponding M1 bits according to the amplitude (i.e., the first real number) of the transmission symbol.

In an embodiment, the method further includes:
step 4202: determining a first mapping relationship between the M1 bits and $2^{M1}$ first real numbers; where the first mapping relationship meets that: two groups of bit sequences each consisting of M1 bits, corresponding to 2 first real numbers with a closest distance to each other among the $2^{M1}$ first real numbers, are different by only 1 bit.

In this embodiment, different value cases of the M1 bits correspond to different real numbers, and there are a total of $2^{M1}$ value cases and corresponding real numbers for the M1 bits, and a Gray mapping is met between the M1 bits and $2^{M1}$ real numbers. Based on the first mapping relationship, M1 bits corresponding to the amplitude of the transmission symbol can be determined.

In an embodiment, the phase of the at least one transmission symbol with index n is obtained by adding the phase of the transmission symbol with index non-n to a second real number, where the second real number is generated according to the M2 bits.

In this embodiment, there is at least one transmission symbol whose phase is determined according to M2 bits and a phase of another transmission symbol together, where for the M2 bits, a corresponding second real number is generated, and the phase of the transmission symbol is equal to a sum of the phase of the another transmission symbol and the second real number.

Step 420 includes:
step 424: determining corresponding M2 bits according to a phase differential component (i.e., a second real number) between the phase of the transmission symbol and a phase of another transmission symbol.

In an embodiment, the method further includes:
step 4204: determining a second mapping relationship between the M2 bits and $2^{M2}$ second real numbers; where the second mapping relationship meets that: two groups of bit sequences each consisting of M2 bits, corresponding to 2 second real numbers with a closest distance to each other among the $2^{M2}$ second real numbers, are different by only 1 bit.

In this embodiment, different value cases of the M2 bits correspond to different real numbers, there are $2^{M2}$ value cases and corresponding real numbers for the M2 bits, and a Gray mapping is met between the M2 bits and $2^{M2}$ real numbers. Based on the second mapping relationship, the M2 bits corresponding to the phase of the transmission symbol can be determined.

In an embodiment, step 410 includes:
determining N+1 transmission symbols $s_0, s_1, s_2, \ldots, s_N$, according to a reference symbol and (M1+M2)*N bits, where 0, 1, 2, . . . , N are indices of the N+1 transmission symbols, $s_0$ is a preset reference symbol, an amplitude of a transmission symbol with index n is determined according to M1 bits, a phase of the transmission symbol with index n is determined according to a phase of a transmission symbol with index n−1 and M2 bits, 1≤n≤N, and N is an integer.

In an embodiment, the reference symbol is a symbol with a preset amplitude and a preset phase; or, a phase of the reference symbol is preset, an amplitude of the reference symbol is determined according to M3 bits, and M3 and M1 are equal or unequal.

According to the method of this embodiment, in the process of generating the transmission symbols, at least one transmission symbol may be demodulated to obtain M1+M2 bits of to-be-transmitted data, thereby improving the spectral efficiency.

Figure 9:
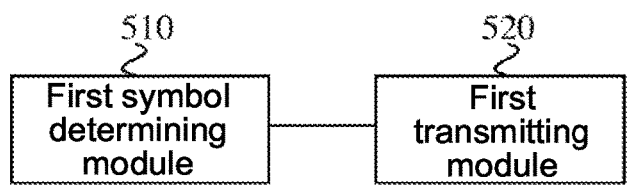
FIG. 9 is a structural schematic diagram of a symbol transmitting apparatus provided by an embodiment.

The embodiments of the present disclosure further provide a symbol transmitting apparatus. FIG. 9 is a structural schematic diagram of a symbol transmitting apparatus provided by an embodiment. As shown in FIG. 9, the symbol transmitting apparatus includes:
a first symbol determining module 510, configured to determine N+1 transmission symbols $s_0, s_1, s_2, \ldots, s_N$ according to a reference symbol and (M1+M2)*N bits, where 0, 1, 2, . . . , N are indices of the N+1 transmission symbols, $s_0$ is a reference symbol, an amplitude of a transmission symbol with index n is determined according to M1 bits, a phase of the transmission symbol with index n is determined according to a phase of a transmission symbol with index n−1 and M2 bits, M1 is an integer greater than or equal to 1, M2 is an integer greater than or equal to 1, N is an integer greater than or equal to 1, 1≤n≤N, and n is an integer; and a first transmitting module 520, configured to transmit the N+1 transmission symbols.

The symbol transmitting apparatus of this embodiment use a phase difference and an amplitude difference of two symbols to carry information of bits, thereby improving the spectral efficiency.

In an embodiment, the first symbol determining module 510 includes a first amplitude determining unit, configured to:

generate a corresponding first real number according to the M1 bits, and take the first real number as the amplitude of the transmission symbol with index n.

In an embodiment, the first symbol determining module 510 includes a second phase determining unit, configured to:

generate a corresponding second real number according to the M2 bits; and add the second real number to the phase of the transmission symbol with index n−1, to obtain the phase of the transmission symbol with index n.

In an embodiment, the apparatus further includes a first mapping module, configured to determine a first mapping relationship between the M1 bits and $2^{M1}$ first real numbers; where the first mapping relationship meets that: two groups of bit sequences each consisting of M1 bits, corresponding to 2 first real numbers with a closest distance to each other among the $2^{M1}$ first real numbers, are different by only 1 bit.

In an embodiment, the apparatus further includes a second mapping module, configured to determine a second mapping relationship between the M2 bits and $2^{M1}$ second real numbers; where the second mapping relationship meets that: two groups of bit sequences each consisting of M2 bits, corresponding to 2 second real numbers with a closest distance to each other among the $2^{M2}$ second real numbers, are different by only 1 bit.

In an embodiment, each first real number is a product of a sub-real number and a corresponding power adjustment factor; and the power adjustment factor is determined according to the $2^{M1}$ sub-real numbers.

In an embodiment, bits used to determine the transmission symbols are divided into multiple groups, where each group includes (M1+M2)*N bits, and the each group corresponds to a reference symbol; and each reference symbol is the same or different.

In an embodiment, M2 bits used to determine a phase of a transmission symbol with an index of an odd number and a corresponding second real number meet a first type of the second mapping relationship; and M2 bits used to determine a phase of a transmission symbol with index of an even number and a corresponding second real number meet a second type of the second mapping relationship.

In an embodiment, the reference symbol is a symbol with a preset amplitude and a preset phase; or, a phase of the reference symbol is preset, an amplitude of the reference symbol is determined according to M3 bits, and M3 and M1 are equal or unequal.

The symbol transmitting apparatus proposed in this embodiment and the symbol transmitting methods proposed in the above-mentioned embodiments belong to the same concept, technical details not exhaustively described in this embodiment may be found in any of the above-mentioned embodiments, and this embodiment has the same effect as performing the symbol transmitting methods.

Figure 10:
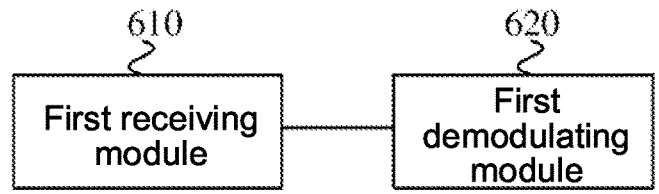
FIG. 10 is a structural schematic diagram of a symbol receiving apparatus provided by an embodiment.

The embodiments of the present disclosure further provide a symbol receiving apparatus. FIG. 10 is a structural schematic diagram of a symbol receiving apparatus provided by an embodiment. As shown in FIG. 10, the symbol receiving apparatus includes:

a first receiving module 610, configured to receive N+1 transmission symbols $s_0, s_1, s_2, \ldots, s_N$, where 0, 1, 2, ..., N are indices of the N+1 transmission symbols, S, is a reference symbol, an amplitude of a transmission symbol with index n is determined according to M1 bits, a phase of the transmission symbol with index n is determined according to a phase of a transmission symbol with index n−1 and M2 bits, M1 is an integer greater than or equal to 1, M2 is an integer greater than or equal to 1, N is an integer greater than or equal to 1, 1≤n≤N, and n is an integer; and a first demodulating module 620, configured to demodulate the N+1 transmission symbols, to obtain (M1+M2)*N bits.

In this embodiment, according to a phase differential component of the transmission symbol with index n with respect to the transmission symbol with index n−1, and the amplitude of the transmission symbol with index n, demodulation can be performed to obtain (M+1)*N bits, and thus, more bits can be obtained by using fewer transmission symbols for demodulating, thereby improving the spectral efficiency.

In an embodiment, the first demodulating module 620 includes:

an amplitude demodulating unit, configured to determine the M1 bits according to the amplitude of the transmission symbol with index n; and a phase demodulating unit, configured to determine M2 bits according to the phase of the transmission symbol with index n and the phase of the transmission symbol with index n−1.

In an embodiment, the amplitude demodulating unit is configured to take the amplitude of the transmission symbol with index n as a first real number, and determine the M1 bits corresponding to the first real number.

In an embodiment, the apparatus further includes a third mapping module, configured to determine a first mapping relationship between the M1 bits and $2^{M1}$ first real numbers; where the first mapping relationship meets that: two groups of bit sequences each consisting of M1 bits, corresponding to 2 first real numbers with a closest distance to each other among the $2^{M1}$ first real numbers, are different by only 1 bit.

In an embodiment, the phase demodulating unit is configured to:

determine a corresponding second real number according to a difference between the phase of the transmission symbol with index n and the phase of the transmission symbol with index n−1; and determine the M2 bits corresponding to the second real number.

In an embodiment, the apparatus further includes a fourth mapping module, configured to determine a second mapping relationship between the M2 bits and $2^{M2}$ second real numbers; where the second mapping relationship meets that: two groups of bit sequences each consisting of M2 bits, corresponding to 2 second real numbers with a closest distance to each other among the $2^{M2}$ second real numbers, are different by only 1 bit.

The symbol receiving apparatus proposed in this embodiment and as the symbol receiving methods proposed in the above-mentioned embodiments belong to the same conception, technical details not exhaustively described in this embodiment may be found in any of the above-mentioned embodiments, and this embodiment has the same effect as performing the symbol receiving methods.

Figure 11:
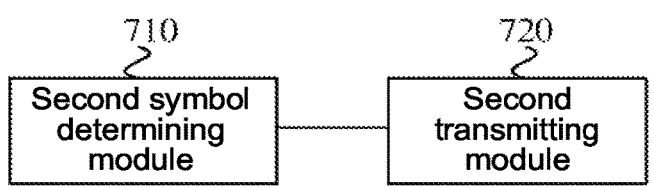
FIG. 11 is a structural schematic diagram of another symbol transmitting apparatus provided by an embodiment.

The embodiments of the present disclosure further provide a symbol transmitting apparatus. FIG. 11 is a structural schematic diagram of another symbol transmitting apparatus provided by an embodiment. As shown in FIG. 11, the symbol transmitting apparatus includes:

a second symbol determining module 710, configured to determine transmission symbols, where an amplitude of at least one transmission symbol with index n is determined according to M1 bits, and a phase of the at least one transmission symbol with index n is determined according to a phase of a transmission symbol with index non-n and M2 bits, M1 is an integer greater than or equal to 1, M2 is an integer greater than or equal to 1, and n is an integer; and a second transmitting module 720, configured to transmit the transmission symbols.

The symbol transmitting apparatus of this embodiment enables at least one transmission symbol to carry M1+M2 bits of information, thereby improving the spectral efficiency.

In an embodiment, the transmission symbol with index non-n is a reference symbol, or a transmission symbol with index n−1.

In an embodiment, the amplitude of the at least one transmission symbol with index n is a first real number generated according to the M1 bits.

In an embodiment, the apparatus further includes a fifth mapping module, configured to determine a first mapping relationship between the M1 bits and $2^{M1}$ first real numbers; where the first mapping relationship meets that: two groups of bit sequences each consisting of M1 bits, corresponding to 2 first real numbers with a closest distance to each other among the $2^{M1}$ first real numbers, are different by only 1 bit.

In an embodiment, the phase of the at least one transmission symbol with index n is obtained by adding the phase of the transmission symbol with index non-n to a second real number, where the second real number is generated according to the M2 bits.

In an embodiment, the apparatus further includes a sixth mapping module, configured to determine a second mapping relationship between the M2 bits and $2^{M2}$ second real numbers; where the second mapping relationship meets that: two groups of bit sequences each consisting of M2 bits, corresponding to 2 second real numbers with a closest distance to each other among the $2^{M2}$ second real numbers, are different by only 1 bit.

In an embodiment, the second symbol determining module 710 is configured to:

determine N+1 transmission symbols $s_0, s_1, s_2, \ldots, s_N$, according to a reference symbol and (M1+M2)*N bits, where 0, 1, 2, ..., N are indices of the N+1 transmission symbols, $s_0$ is a preset reference symbol, an amplitude of a transmission symbol with index n is determined according to M1 bits, a phase of the transmission symbol with index n is determined according to a phase of a transmission symbol with index n−1 and M2 bits, 1≤n≤N, and N is an integer.

In an embodiment, the reference symbol is a symbol with a preset amplitude and a preset phase; or, a phase of the reference symbol is preset, an amplitude of the reference symbol is determined according to M3 bits, and M3 and M1 are equal or unequal.

In an embodiment, M2 bits used to determine a phase of a transmission symbol with an index of an odd number and a corresponding second real number meet a first type of the second mapping relationship; and M2 bits used to determine a phase of a transmission symbol with index of an even number and a corresponding second real number meet a second type of the second mapping relationship.

The symbol transmitting apparatus proposed in this embodiment and the symbol transmitting methods proposed in the above-mentioned embodiments belong to the same concept, technical details not exhaustively described in this embodiment may be found in any of the above-mentioned embodiments, and this embodiment has the same effect as performing the symbol transmitting methods.

Figure 12:
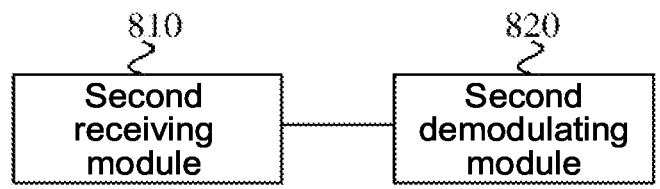
FIG. 12 is a structural schematic diagram of another symbol receiving apparatus provided by an embodiment.

The embodiments of the present disclosure further provide a symbol receiving apparatus. FIG. 12 is a structural schematic diagram of another symbol receiving apparatus provided by an embodiment. As shown in FIG. 12, the symbol receiving apparatus includes:

a second receiving module 810, configured to receive transmission symbols, where an amplitude of at least one transmission symbol with index n is determined according to M1 bits, and a phase of the at least one transmission symbol with index n is determined according to a phase of a transmission symbol with index non-n and M2 bits, M1 is an integer greater than or equal to 1, M2 is an integer greater than or equal to 1, and n is an integer; and a second demodulating module 820, configured to demodulate the transmission symbols, to obtain bits used to determine the transmission symbols, where the bits used to determine the transmission symbols include M1+M2 bits.

The symbol receiving apparatus of the present embodiment may perform demodulation and obtain M1+M2 bits according to the amplitude of the transmission symbol with index n, and a phase differential component of the phase of the transmission symbol with index n with respect to the transmission symbol with index n−1, thereby improving the spectral efficiency.

In an embodiment, the transmission symbol with index non-n is a reference symbol, or a transmission symbol with index n−1.

In an embodiment, the amplitude of the at least one transmission symbol with index n is a first real number generated according to the M1 bits.

In an embodiment, the apparatus further includes a seventh mapping module, configured to determine a first mapping relationship between the M1 bits and $2^{M1}$ first real numbers; where the first mapping relationship meets that: two groups of bit sequences each consisting of M1 bits, corresponding to 2 first real numbers with a closest distance to each other among the $2^{M1}$ first real numbers, are different by only 1 bit.

In an embodiment, the phase of the at least one transmission symbol with index n is obtained by adding the phase of the transmission symbol with index non-n to a second real number, where the second real number is generated according to the M2 bits.

In an embodiment, the apparatus further includes an eighth mapping module, configured to determine a second mapping relationship between the M2 bits and $2^{M2}$ second real numbers; where the second mapping relationship meets that: two groups of bit sequences each consisting of M2 bits, corresponding to 2 second real numbers with a closest distance to each other among the $2^{M2}$ second real numbers, are different by only 1 bit.

In an embodiment, N+1 transmission symbols $s_0, s_1, s_2, \ldots, s_N$ are determined according to the reference symbol and (M1+M2)*N bits, where 0, 1, 2, ..., N are indices of the N+1 transmission symbols, $s_0$ is a preset reference symbol, an amplitude of a transmission symbol with index n is determined according to M1 bits, a phase of the transmission symbol with index n is determined according to a phase of a transmission symbol with index n−1 and M2 bits, 1≤n≤N, and N is an integer.

In an embodiment, the reference symbol is a symbol with a preset amplitude and a preset phase; or, a phase of the reference symbol is preset, an amplitude of the reference symbol is determined according to M3 bits, and M3 and M1 are equal or unequal.

In an embodiment, M2 bits used to determine a phase of a transmission symbol with an index of an odd number and a corresponding second real number meet a first type of the second mapping relationship; and M2 bits used to determine a phase of a transmission symbol with index of an even number and a corresponding second real number meet a second type of the second mapping relationship.

The symbol receiving apparatus proposed in this embodiment and as the symbol receiving methods proposed in the above-mentioned embodiments belong to the same conception, technical details not exhaustively described in this embodiment may be found in any of the above-mentioned embodiments, and this embodiment has the same effect as performing the symbol receiving methods.

Figure 13:
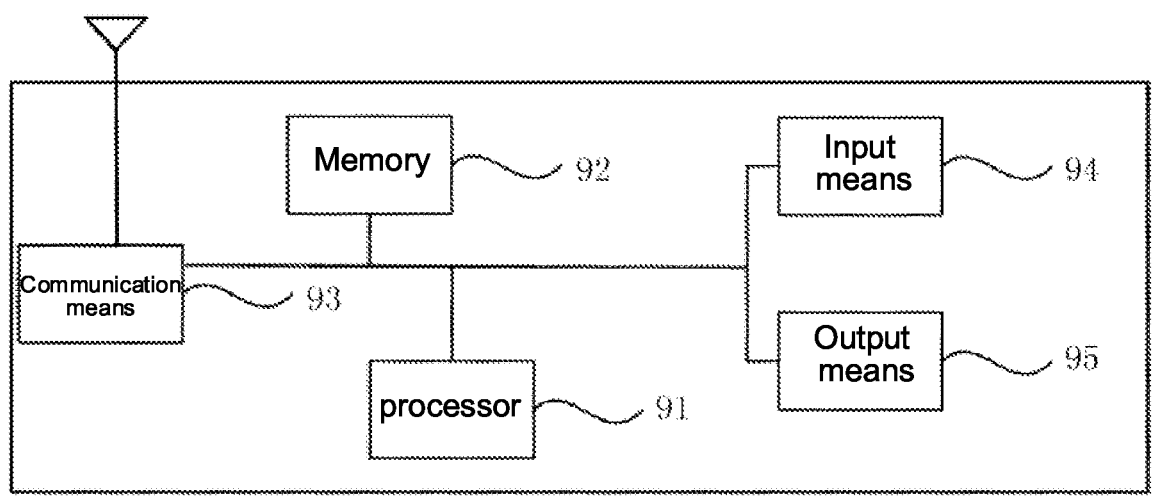
FIG. 13 is a hardware structural schematic diagram of a transmitting device provided by an embodiment.

The embodiments of the present disclosure further provide a transmitting device, and FIG. 13 is a hardware structural schematic diagram of a transmitting device provided by an embodiment. As shown in FIG. 13, the transmitting device provided by the present disclosure includes a memory 92, a processor 91, and a computer program stored on the memory 92 and runnable on the processor 91, and the processor 91, upon executing the program, implements the above-mentioned symbol transmitting methods.

The transmitting device may further include the memory 92; the processor 91 in the transmitting device may be one or more, and one processor 91 is taken as an example in FIG. 13; the memory 92 is used for storing one or more programs; the one or more programs are executed by the one or more processors 91, so that the one or more processors 91 implement the symbol transmitting method described in the embodiments of the present disclosure.

The transmitting device further includes: a communication means 93, an input means 94 and an output means 95.

The processor 91, the memory 92, the communication means 93, the input means 94, and the output means 95 in the transmitting device may be connected by a bus or in other ways, and the connection through the bus is taken as an example in FIG. 13.

The input means 94 may be used to receive an input digital or character information, and generate a key signal input related to a user setting and function control of the transmitting device. The output means 95 may include a display means such as a display screen, etc.

The communication means 93 may include a receiver and a transmitter. The communication means 93 is configured to communicate information according to the control of the processor 91.

The memory 92, as a computer-readable storage medium, may be configured to store a software program, a computer-executable program, and a module, such as a program instruction/module (e.g., the first symbol determining module 510 and the first transmitting module 520 in the symbol transmitting device) corresponding to the symbol transmitting methods in the embodiments of the present disclosure. The memory 92 may include a storage program area and a storage data area, where the storage program area may store an operating system, an application program required for at least one function; and the storage data area may store data created according to the usage of the transmitting device, and so on. Additionally, the memory 92 may include a high speed random access memory, and may also include a non-volatile memory, such as at least one magnetic disk storage device, a flash memory device, or other non-volatile solid state storage device. In some examples, the memory 92 may include memories set remotely with respect to the processor 91, and these remote memories may be connected to the transmitting device through a network. Examples of the above networks include, but are not limited to, the Internet, an intranet, a local area network, a mobile communication network and combinations thereof.

Figure 14:
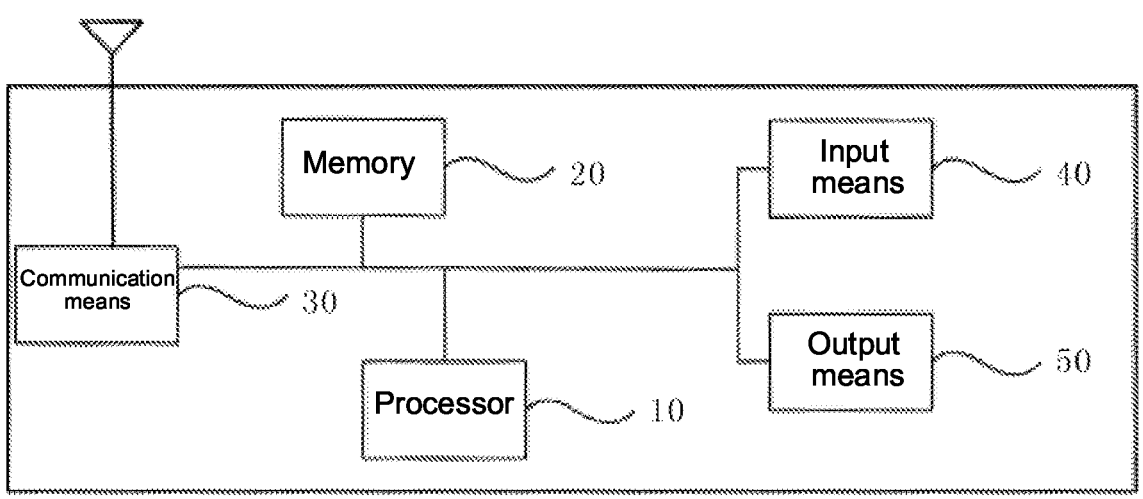
FIG. 14 is a hardware structural diagram of a receiving device provided by an embodiment.

The embodiments of the present disclosure further provide a receiving device, and FIG. 14 is a hardware structural schematic diagram of a receiving device provided by an embodiment. As shown in FIG. 14, the receiving device provided by the present disclosure includes a memory 20, a processor 10, and a computer program stored on the memory 20 and runnable on the processor 10, and the processor 10, upon executing the program, implements the above-mentioned symbol receiving method.

The receiving device may further include the memory 20; the processor 10 in the receiving device may be one or more, and one processor 10 are taken as an example in FIG. 14; the memory 20 is used for storing one or more programs; the one or more programs are executed by the one or more processors 10, so that the one or more processors 10 implement the symbol receiving method described in the embodiments of the present disclosure.

The receiving device further includes: a communication means 30, an input means 40 and an output means 50.

The processor 10, the memory 20, the communication means 30, the input means 40, and the output means 50 in the receiving device may be connected by a bus or in other ways, and the connection through the bus is taken as an example in FIG. 14.

The input device 40 may be used to receive an input digital or character information, and generate a key signal input related to a user setting and a function control of the receiving device. The output means 50 may include a display means such as a display screen, etc.

The communication means 30 may include a receiver and a transmitter. The communication means 30 is configured to communicate information according to the control of the processor 10.

The memory 20, as a computer-readable storage medium, may be configured to store a software program, a computer-executable program, and a module, such as a program instruction/module (e.g., the first receiving module 61 and the first demodulating module 620 in the symbol receiving apparatus) corresponding to the symbol receiving method described in the embodiments of the present disclosure. The memory 20 may include a storage program area and a storage data area, where the storage program area may store an operating system, an application program required for at least one function; and the storage data area may store data created according to the usage of the receiving device, and so on. Additionally, the memory 20 may include a high speed random access memory, and may also include a non-volatile memory, such as at least one magnetic disk storage device, a flash memory device, or other non-volatile solid state storage device. In some examples, the memory 20 may include memories set remotely relative to the processor 10, and these remote memories may be connected to the receiving device by a network. Examples of the above networks include, but are not limited to, the Internet, an intranet, a local area network, a mobile communication network and combinations thereof.

The embodiments of the present disclosure further provide a storage medium having stored a computer program thereon, the computer program, upon being executed by a processor, implements the symbol transmitting method or the symbol receiving method described in any one of the embodiments of the present disclosure. The symbol transmitting method includes: N+1 transmission symbols $s_0, s_1, s_2, \ldots, s_N$ is determined according to a reference symbol and (M1+M2)*N bits, where $0, 1, 2, \ldots, N$ are indices of the N+1 transmission symbols, $s_0$ is a reference symbol, an amplitude of a transmission symbol with index n is determined according to M1 bits, a phase of the transmission symbol with index n is determined according to a phase of a transmission symbol with index n−1 and M2 bits, M1 is an integer greater than or equal to 1, M2 is an integer greater than or equal to 1, N is an integer greater than or equal to 1, $1 \leq n \leq N$, and n is an integer; and transmitting the N+1 transmission symbols.

The symbol receiving method includes: N+1 transmission symbols $s_0, s_1, s_2, \ldots, s_N$ are received, where $0, 1, 2, \ldots, N$ are indices of the N+1 transmission symbols, $s_0$ is a reference symbol, an amplitude of a transmission symbol with index n is determined according to M1 bits, a phase of the transmission symbol with index n is determined according to a phase of a transmission symbol with index n−1 and M2 bits, M1 is an integer greater than or equal to 1, M2 is an integer greater than or equal to 1, N is an integer greater than or equal to 1, $1 \leq n \leq N$, and n is an integer; and demodulating the N+1 transmission symbols, to obtain (M1+M2)*N bits.

Or, the symbol transmitting method includes: determining transmission symbols, where an amplitude of at least one transmission symbol with index n is determined according to M1 bits, and a phase of the at least one transmission symbol with index n is determined according to a phase of a transmission symbol with index non-n and M2 bits, M1 is an integer greater than or equal to 1, M2 is an integer greater than or equal to 1, and n is an integer; and transmitting the transmission symbols.

The symbol receiving method includes: receiving transmission symbols, where an amplitude of at least one transmission symbol with index n is determined according to M1 bits, and a phase of the at least one transmission symbol with index n is determined according to a phase of a transmission symbol with index non-n and M2 bits, M1 is an integer greater than or equal to 1, M2 is an integer greater than or equal to 1, and n is an integer; and demodulating the transmission symbols, to obtain bits used to determine the transmission symbols, where the bits used to determine the transmission symbols include M1+M2 bits.

The computer storage medium in the embodiments of the present disclosure may adopt any combination of one or more computer readable media. The computer readable medium may be a computer readable signal medium or a computer readable storage medium. A computer readable storage medium may be, for example, but not limited to, an electrical, magnetic, optical, electromagnetic, infrared, or semiconductor system, apparatus or means, or any combination thereof. Examples (a non-exhaustive list) of a computer readable storage medium include: an electrical connection with one or more wires, a portable computer magnetic disk, a hard disk, a random access memory (RAM), a read only memory (ROM), an erasable programmable read only memory (EPROM), a flash memory, an optical fiber, a portable CD-ROM, an optical storage means, a magnetic storage means, or any suitable combination of the above. A computer readable storage medium may be any tangible medium that contains or stores a program which is used by or in combination with, an instruction executing system, apparatus, or means.

A computer readable signal medium may include a data signal, which is propagated in a baseband or as a part of a carrier wave, and in which a computer readable program code is carried. Such a propagated data signal may have many forms, including but not limited to: an electromagnetic signal, an optical signal, or any suitable combination of the above. A computer readable signal medium may also be any computer readable medium other than the computer readable storage medium, and the computer readable medium may send, propagate, or transmit the program which is used by or in combination with the instruction executing system, apparatus, or means.

A program code contained on the computer readable medium may be transmitted using any appropriate medium, including but not limited to: wireless, wire, optical cable, radio frequency (RF), etc., or any suitable combination of the above.

The computer program code for performing operations of the present disclosure may be written in one or more programming languages, or a combination thereof, including an object-oriented programming language—such as Java, Smalltalk, C++, and also including conventional procedural programming language—such as "C" language or a similar programming language. The program code may be executed entirely a user's computer, partly on the user's computer, as a stand-alone software package, partly on the user's computer and partly on a remote computer, or entirely on the remote computer or a server. In a case where the remote computer is involved, the remote computer may be connected to the user's computer by any kind of network, including a local area network (LAN) or a wide area network (WAN), or may be connected to an external computer (e.g., connected by the Internet using an Internet service provider).

The foregoing is only the exemplary embodiments of the present disclosure.

Those skilled in the art should understand that, the term "user terminal" covers any suitable type of wireless user equipment, for example, a mobile phone, a portable data processing apparatus, a portable web browser or a vehicle-mounted mobile station.

In general, many embodiments of the present disclosure may be implemented in a hardware or an application specific circuit, a software, a logic or any combination thereof. For example, in some aspects, the embodiments may be implemented in the hardware, and in other aspects, the embodiments may be implemented in the hardware or the software which may be executed by a controller, a microprocessor or other computing apparatuses, although the present disclosure is not limited herein.

The embodiments of the present disclosure may be implemented by a data processor of a mobile apparatus (e.g., in a processor entity, or by the hardware, or by a combination of the software and the hardware) executing the computer program instruction. The computer program instructions may be assembly instructions, instruction set architecture (ISA) instructions, machine instructions, machine-related instructions, microcodes, firmware instructions, state setting data, or source codes or object codes written in any combination of one or more programming languages.

The block diagrams of any logic flow in the drawings of the present disclosure may represent program steps, or may represent the interconnected logic circuits, modules, and functions, or may represent a combination of program steps, and logic circuits, modules and functions. The computer program may be stored on the memory. The memory may be of any type suitable for the local technical environment and may be implemented by using any suitable data storage technology, for example, but is not limited to, a read-only memory (ROM), a random access memory (RAM), or an optical memory apparatus and system (Digital Video Disc (DVD) or Compact Disk (CD)), etc. The computer readable medium may include a non-transitory storage medium. The data processor may be of any type suitable for the local technical environment, for example, but not limited to, a general purpose computer, an application specific computer, a microprocessor, a digital signal processor (DSP), an application specific integrated circuit (ASIC), a field-programmable gate array (FPGA), and a processor based on a multi-core processor architecture.

What is claimed is:

1. A symbol transmitting method, comprising:
    determining N+1 transmission symbols $s_0, s_1, s_2, \ldots, s_N$, according to a reference symbol and (M1+M2)*N bits, wherein $0, 1, 2, \ldots, N$ are indices of the N+1 transmission symbols, $s_0$ is a reference symbol, an amplitude of a transmission symbol with index n is determined according to M1 bits, a phase of the transmission symbol with index n is determined according to a phase of a transmission symbol with index n−1 and M2 bits, M1 is an integer greater than or equal to 1, M2 is an integer greater than or equal to 1, N is an integer greater than or equal to 1, 1≤n≤N, and n is an integer; and
    transmitting the N+1 transmission symbols.

2. The method according to claim 1, wherein the amplitude of the transmission symbol with index n is determined by:
    generating a corresponding first real number according to the M1 bits, and taking the first real number as the amplitude of the transmission symbol with index n.

3. The method according to claim 2, further comprising:
    determining a first mapping relationship between the M1 bits and $2^{M1}$ first real numbers;
    wherein the first mapping relationship meets that: two groups of bit sequences each consisting of M1 bits, corresponding to 2 first real numbers with a closest distance to each other among the $2^{M1}$ first real numbers, are different by only 1 bit.

4. The method according to claim 3, wherein each first real number of the $2^{M1}$ first real numbers is a product of a sub-real number and a corresponding power adjustment factor; and
    the power adjustment factor is determined according to $2^{M1}$ sub-real numbers.

5. The method according to claim 1, wherein the phase of the transmission symbol with index n is determined by:
    generating a corresponding second real number according to the M2 bits; and
    adding the second real number to the phase of the transmission symbol with index n−1, to obtain the phase of the transmission symbol with index n.

6. The method according to claim 5, further comprising:
    determining a second mapping relationship between the M2 bits and $2^{M2}$ second real numbers;
    wherein the second mapping relationship meets that: two groups of bit sequences each consisting of M2 bits, corresponding to 2 second real numbers with a closest distance to each other among the $2^{M2}$ second real numbers, are different by only 1 bit.

7. The method according to claim 6, wherein M2 bits used to determine a phase of a transmission symbol with index of an odd number and a corresponding second real number meet a first type of the second mapping relationship; and M2 bits used to determine a phase of a transmission symbol with index of an even number and a corresponding second real number meet a second type of the second mapping relationship.

8. The method according to claim 1, wherein bits used to determine transmission symbols are divided into multiple groups, wherein each group of the multiple groups comprises (M1+M2)*N bits, and the each group corresponds to a reference symbol; and
    multiple reference symbols of the multiple groups are the same or different.

9. The method according to claim 1, wherein the reference symbol is a symbol with a preset amplitude and a preset phase; or, a phase of the reference symbol is preset, an amplitude of the reference symbol is determined according to M3 bits, and M3 and M1 are equal or unequal.

10. A transmitting device, comprising a memory, a processor, and a computer program stored on the memory and runnable on the processor, wherein the processor, upon executing the program, implements the symbol transmitting method of claim 1.

11. A non-transitory computer readable storage medium having stored a computer program thereon, wherein the program, upon being executed by a processor, implements the symbol transmitting method of claim 1.

12. A symbol receiving method, comprising:
    receiving N+1 transmission symbols $s_0, s_1, s_2, \ldots, s_N$, wherein $0, 1, 2, \ldots, N$ are indices of the N+1 transmission symbols, $s_0$ is a reference symbol, an amplitude of a transmission symbol with index n is determined according to M1 bits, a phase of the transmission symbol with index n is determined according to a phase of a transmission symbol with index n−1 and M2 bits, M1 is an integer greater than or equal to 1, M2 is an integer greater than or equal to 1, N is an integer greater than or equal to 1, 1≤n≤N, and n is an integer; and
    demodulating the N+1 transmission symbols, to obtain (M1+M2)*N bits.

13. A receiving device, comprising a memory, a processor, and a computer program stored on the memory and runnable on the processor, wherein the processor, upon executing the program, implements the symbol receiving method of claim 12.

14. A symbol transmitting method, comprising:
    determining transmission symbols, wherein an amplitude of at least one transmission symbol with index n is determined according to M1 bits, and a phase of the at least one transmission symbol with index n is determined according to a phase of a transmission symbol with index non-n and M2 bits, M1 is an integer greater than or equal to 1, M2 is an integer greater than or equal to 1, and n is an integer; and
    transmitting the transmission symbols.

15. The method according to claim 14, wherein the transmission symbol with index non-n is a reference symbol, or a transmission symbol with index n−1.

16. The method according to claim 14, wherein the amplitude of the at least one transmission symbol with index n is a first real number generated according to the M1 bits.

17. The method according to claim 16, further comprising:
    determining a first mapping relationship between the M1 bits and $2^{M1}$ first real numbers;

wherein the first mapping relationship meets that: two groups of bit sequences each consisting of M1 bits, corresponding to 2 first real numbers with a closest distance to each other among the $2^{M1}$ first real numbers, are different by only 1 bit.

18. The method of claim 14, wherein the phase of the at least one transmission symbol with index n is obtained by adding the phase of the transmission symbol with index non-n and a second real number, wherein the second real number is generated according to the M2 bits.

19. The method according to claim 18, further comprising:
   determining a second mapping relationship between the M2 bits and $2^{M2}$ second real numbers;
   wherein the second mapping relationship meets that: two groups of bit sequences each consisting of M2 bits, corresponding to 2 second real numbers with a closest distance to each other among the $2^{M2}$ second real numbers, are different by only 1 bit.

20. The method according to claim 14, wherein the determining the transmission symbols, comprises:
   determining N+1 transmission symbols $s_0, s_1, s_2, \ldots, s_N$, according to a reference symbol and (M1+M2)*N bits, wherein $0, 1, 2, \ldots, N$ are indices of the N+1 transmission symbols, $s_0$ is a preset reference symbol, an amplitude of a transmission symbol with index n is determined according to M1 bits, a phase of the transmission symbol with index n is determined according to a phase of a transmission symbol with index n−1 and M2 bits, $1 \leq n \leq N$, and N is an integer.

* * * * *